Patented Dec. 30, 1941

2,268,136

UNITED STATES PATENT OFFICE 2,268,136

PRODUCTION OF MALEIC ACID FROM SUCCINIC ACID

Otto Drossbach, Ludwigshafen-on-the-Rhine, Germany, assignor to I. G. Farbenindustrie Aktiengesellschaft, Frankfort - on - the - Main, Germany No Drawing. Application November 26, 1940, Serial No. 367,241. In Germany January 4, 1940

8 Claims. (Cl. 260—537)

The present invention relates to the production of maleic acid by the catalytic oxidation of succinic acid.

The preparation of maleic acid by the catalytic oxidation of organic compounds has heretofore been suggested. Thus, benzene has been led in the vapor state together with oxygen or air over oxidation catalysts in order to produce maleic acid. Diolefinic hydrocarbons, such as 1.3-butadiene or cyclopentadiene, have likewise been converted into maleic acid. It has also been proposed to catalytically oxidize compounds of the furane series containing conjugated olefinic linkages, such as furane itself and its substitution products. In the production of maleic acid from these compounds, there are usually formed various by-products, such as carbon dioxide which decrease the yield of maleic acid.

The present invention has the main object to provide as the starting material for the catalytic production of maleic acid a compound which may be converted into very pure maleic acid in extraordinary high yields. I have found that succinic acid may be easily and economically converted into maleic acid by passing the vapors of succinic acid in admixture with oxygen, air or another oxygen containing gas, such as mixtures of oxygen and carbon dioxide or steam, over a suitable oxidation catalyst. It is to be understood that the terms "succinic acid" and "maleic acid" as used herein include both the anhydrides and the hydrates. Under the reaction conditions the anhydride and the hydrate thereof are often present together.

The oxidation is carried out preferably at temperatures ranging from 250 to 600° C., and preferably from 300 to 450° C. The actual temperature to be used depends on the activity of the catalyst and on the time of contact between the reaction mixture of gases and the catalyst. When working at comparatively low temperatures, e. g. within the range of approximately 250 to 350° C., the time of contact should be longer than at higher temperatures, e. g. at from 400 to 500° C. In general, the time of contact may vary over a considerable range without materially affecting the yield of maleic acid. The time of contact should be long enough to insure that at least part of the starting material introduced is subjected to oxidation before leaving the catalyst. On the other hand, the time of contact should not be so long that the maleic acid is further oxidized.

The concentration of the vaporized starting material in the mixture to be passed over the catalyst may also vary to a considerable extent. Generally speaking, it is preferable to provide for an excess of oxygen, air or other oxygen containing gases. Care has to be taken to avoid explosive conditions. The ratio of succinic acid to oxygen, however, may be higher than that hitherto used, since mixtures of vaporized succinic acid and oxygen are less explosive than mixtures of the starting materials hitherto used with oxygen. It is self-understood that higher proportions of the oxidizing gas may be used but this does not involve economical advantages because a too large excess of the oxidizing gas simply constitutes a diluent decreasing the yield per unit of time and reaction space and rendering the recovery of maleic acid and unchanged succinic acid more difficult.

As catalyst there may be used any good catalyst capable of promoting the oxidation of organic compounds to dicarboxylic acids, e. g. the oxidation of benzene, crotonaldehyde, butylene glycol or diolefines to maleic acid. Catalysts containing as their main reactive component one or more difficultly reducible oxides of a metal from the fifth or sixth group of the periodic table are particularly suitable. These oxides may also be used in the form of salts. Among the oxides which have been found to be especially suitable oxidation catalysts according to my invention there may be mentioned oxides of vanadium and molybdenum, in particular vanadic and molybdic acid or lower oxides of these metals and mixtures thereof in varying proportions. Titanic acid may also be used, especially when admixed with the lower oxides of vanadium and molybdenum as they are obtained, for example, by reducing vanadic or molybdic acid by means of aqueous oxalic acid. The oxides of vanadium and molybdenum may also be admixed with zinc oxide, cerium oxide, tungstic acid, chromium oxide, lead oxide or cobalt oxide. These catalysts may be employed either alone or applied to the conventional carrier substances, such as pumice stone, aluminum oxide, fused silica and the like. It will be understood that the above given explanation of the catalysts is merely given for purposes of illustration and that the specific catalyst is not an essential part of my invention but that numerous modifications of these catalysts may be made without departure from the spirit of my invention and that any other of the conventional catalysts employed in oxidations of this type may be used.

The catalyst is preferably arranged in the form of layers in a vertical tube or a plurality of such tubes or filled into a horizontal tube or a plurality of such tubes. The length of the catalyst layer may vary between a few centimeters and one or more meters. When employing short catalyst layers, the reaction temperature should be comparatively high and the speed of flow should be so chosen that the reaction mixture of gases is in contact with the catalyst less than one second.

The invention will be described in greater detail in the following examples which illustrate a few typical embodiments of the invention. It is, however, not restricted to these examples.

Example 1

A mixture of nitrogen and oxygen (ratio by volume 95 to 5) is led through melted succinic acid anhydride heated to 170° C. A mixture is thus obtained which contains 70 grams of succinic acid anhydride for 100 grams of oxygen. 160 liters of the mixture are led per hour at 325° C. over 80 cubic centimeters of a vanadium catalyst, obtained by heating small particles of a mixture of vanadic acid and silicic acid gel to 350° C. while reducing it. The time of contact amounts to 0.3 second.

The gases leaving the catalyst are cooled to normal temperature and washed with water. There is obtained a mixture of 24 per cent of succinic acid and 76 per cent of maleic acid from which the succinic acid is separated off; it may be used again.

Example 2

150 liters of air are admixed per hour with 9 grams of vaporized succinic acid anhydride and led at 350° C. over 100 cubic centimeters of a molybdenum catalyst obtained by coating granulated pumice stone with ammonium molybdate. By cooling to normal temperature the reaction gases and washing with water a mixture of 70 per cent of maleic acid and 30 per cent of succinic acid is obtained.

Example 3

180 liters of a mixture of succinic acid anhydride and air, obtained in the manner described in Example 2, are hourly led at 440° C. over 100 cubic centimeters of a catalyst prepared in the following manner: titanic acid, vanadic acid, oxalic acid and ammonium molybdate in the ratio by weight 10:5.3:6.7:18.3 are mixed and the mixture is boiled for 2 hours with water. From the resulting deep-blue suspension the water is removed by heating in the presence of grains of pumice stone, while stirring, and then heated for 4 hours at 300° C. in the open air.

The gases resulting from the catalyst are cooled to 55° C. Liquid maleic acid anhydride is thus obtained which is free from succinic acid anhydride. The residual gases are washed with water. By evaporating the aqueous solution there may be obtained a further amount of maleic acid.

What I claim is:

1. A process for the production of maleic acid which comprises passing a vaporous mixture of succinic acid with a gas comprising oxygen over an oxidizing catalyst at a temperature within the range of 250 to 600° C.

2. A process for the production of maleic acid which comprises passing a vaporous mixture of succinic acid with a gas comprising oxygen over an oxidizing catalyst at a temperature within the range of 300 to 450° C.

3. A process for the producton of maleic acid which comprises passing a vaporous mixture of succinic acid with oxygen and an inert diluent gas over an oxidizing catalyst at a temperature within the range of 250 to 600° C.

4. A process for the production of maleic acid which comprises passing a vaporous mixture of succinic acid with a gas comprising oxygen over a catalyst comprising a difficultly reducible oxide of a metal selected from the fifth and sixth group of the periodic table at a temperature within the range of 250 to 600° C.

5. A process for the production of maleic acid which comprises passing a vaporous mixture of succinic acid with a gas comprising oxygen over a vanadium oxide catalyst at a temperature within the range of 250 to 600° C.

6. A process for the production of maleic acid which comprises passing a vaporous mixture of succinic acid with a gas comprising oxygen over a vandium oxide catalyst at a temperature within the range of 300 to 450° C.

7. A process for the production of maleic acid which comprises passing a vaporous mixture of succinic acid with a gas comprising oxygen over a molybdenum oxide catalyst at a temperature within the range of 250 to 600° C.

8. A process for the production of maleic acid which comprises passing a vaporous mixture of succinic acid with a gas comprising oxygen over a molybdenum oxide catalyst at a temperature within the range of 300 to 450° C.

OTTO DROSSBACH.